United States Patent
Ono et al.

[11] Patent Number: 6,065,878
[45] Date of Patent: May 23, 2000

[54] SLIDE BEARING

[75] Inventors: Akira Ono; Koichi Yamamoto; Takayuki Shibayama, all of Nagoya, Japan

[73] Assignee: Daido Metal Company Ltd., Nagoya, Japan

[21] Appl. No.: 09/195,207

[22] Filed: Nov. 18, 1998

[30] Foreign Application Priority Data

Feb. 13, 1998 [JP] Japan .................................. 10-031038

[51] Int. Cl.⁷ ...................................................... F16C 33/10
[52] U.S. Cl. .......................... 384/288; 384/294; 384/429
[58] Field of Search ..................... 384/100, 118, 384/276, 286, 288, 294, 322, 430, 429, 432

[56] References Cited

U.S. PATENT DOCUMENTS

| | | | |
|---|---|---|---|
| 2,914,367 | 4/1959 | Underwood | 384/288 |
| 3,287,072 | 11/1966 | Buske | 384/286 |
| 3,495,685 | 2/1970 | Van Rinsum | 384/288 |
| 5,009,522 | 4/1991 | Hahn | 384/288 |

Primary Examiner—Thomas R. Hannon
Attorney, Agent, or Firm—Browdy and Neimark

[57] ABSTRACT

In a slide bearing attached onto a bearing mounting surface including at least one of recess and hole facing to the slide bearing, a bearing surface faces to a counter member to be borne movably by the slide bearing, a reverse surface contacts with the bearing mounting surface, and a relief surface is arranged adjacent to the at least one of recess and hole in a slide bearing thickness direction and faces to the counter member with a relatively large clearance between the relief surface and the counter member in comparison with a clearance between the bearing surface and the counter member.

19 Claims, 5 Drawing Sheets

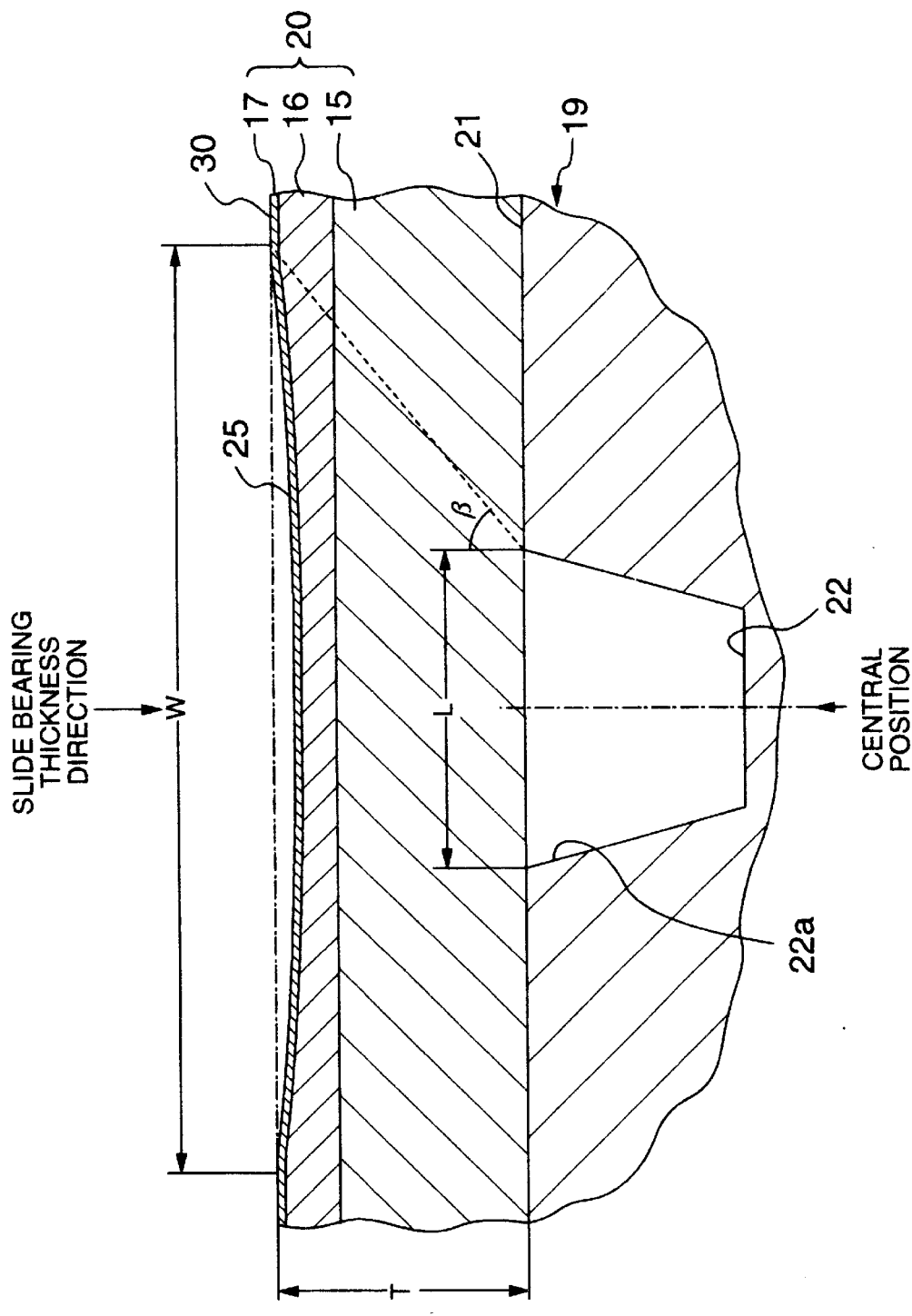

SLIDE BEARING

BACKGROUND OF THE INVENTION AND RELATED ART STATEMENT

The present invention relates to a slide bearing attached onto a surface including a recess or hole facing to the slide bearing.

The surface onto which the slide bearing is mounted includes the recess or hole as a so-called lubricant hole or groove for supplying a fluidal lubricant to the slide bearing through the recess or hole.

OBJECT AND SUMMARY OF THE INVENTION

An object of the present invention is to provide a slide bearing with a high anti-fatigue-breakage characteristic although facing to the recess or hole of the surface onto which the slide bearing is attached.

In a slide bearing adapted to be attached onto a bearing mounting surface including at least one of recess and hole facing to the slide bearing, comprising, a bearing surface adapted to face to a counter member to be borne movably by the slide bearing, and a reverse surface adapted to contact with the bearing mounting surface, the bearing surface is juxtaposed to a relief surface adapted to be arranged adjacent to the at least one of recess and hole in a slide bearing thickness direction, and adapted to face to the counter member with a relatively larger clearance depth between the relief surface and the counter member in comparison with a clearance depth between the bearing surface and the counter member in the slide bearing thickness direction.

Since the relief surface forms the clearance depth between the relief surface and the counter member larger than the clearance depth between the bearing surface and the counter member in the slide bearing thickness direction, a load from the counter member to be borne on the relief surface is decreased so that a stress generated at the relief surface is decreased to improve an anti-fatigue-breakage characteristic of the relief surface although the relief surface faces to the recess or hole of the surface onto which the slide bearing is attached.

If the relief surface is arc-shaped as seen in a direction parallel to the bearing surface, a local concentration of stress at the relief surface is further restrained. If a thickness of the slide bearing at the bearing surface is larger than a thickness of the slide bearing at the relief surface, the reverse surface can extend continuously without an abrupt change in shape of the reverse surface at a portion of the reverse surface adjacent to the relief surface in the slide bearing thickness direction. The relief surface may cave in relative to the bearing surface before the slide bearing is attached onto the bearing mounting surface. A part of the reverse surface at a reverse area of the relief surface may cave in relative to another part of the reverse surface at a reverse area of the bearing surface before the slide bearing is attached onto the bearing mounting surface. If a cross-sectional area of the at least one of recess and hole is not larger than that of the relief surface as seen in the slide bearing thickness direction, the local concentration of stress at the relief surface is securely restrained.

If the slide bearing comprises a through hole for fluidal communication between the at least one of recess and hole and a clearance between the relief surface and the counter member, and a cross-sectional area of the through hole is smaller than that of the at least one of recess and hole as seen in the slide bearing thickness direction, a flow rate of the fluidal communication can be throttled desirably by the through hole. If a clearance depth between the relief surface and the counter member increases toward a central position of the at least one of recess and hole as seen in the slide bearing thickness direction, a minimum value of a dynamic lubricant pressure is generated on the relief surface so that a stress of the slide bearing at the relief surface is significantly decreased. If a clearance between the relief surface and the counter member is surrounded by a clearance between the bearing surface and the counter member as seen in the slide bearing thickness direction, the dynamic lubricant pressure on the relief surface is prevented from decreasing excessively. It is necessary that a clearance between the relief surface and the counter member is limited to such a degree that the relief surface bears the counter member by a dynamic pressure of a fluidal lubricant generated on the relief surface by a relative movement between the relief surface and the counter member and the dynamic pressure of the fluidal lubricant generated on the relief surface is smaller than another dynamic pressure of the fluidal lubricant generated on the bearing surface by a relative movement between the bearing surface and the counter member. When the slide bearing includes a backing plate of relatively large elastic coefficient and a bearing layer of relatively small elastic coefficient on the backing plate, and the bearing layer faces to the counter member, it is preferable for improving the anti-fatigue-breakage characteristic by preventing an abrupt change in thickness of the backing plate as a main strength member of the slide bearing that a thickness of the backing plate under the relief surface is substantially equal to a thickness of the backing plate under the bearing surface, and a thickness of the bearing layer under the relief surface is smaller than a thickness of the bearing layer under the bearing surface so that the relief surface caves in relative to the bearing surface.

If the backing plate is fully covered by the bearing layer as seen in the slide bearing thickness direction, an undesirable small substance between the slide bearing and the counter member can be embedded securely into the bearing layer, when the backing plate is made of a relatively hard material such as steel, and the bearing layer is made of a relatively soft material.

It is preferable for improving the anti-fatigue-breakage characteristic on the relief surface by preventing the abrupt change in thickness of the backing plate as the main strength member of the slide bearing that a thickness of the backing plate under the relief surface is substantially constant and/or that a maximum distance between the relief surface and the bearing surface in the slide bearing thickness direction is not more than a thickness of the bearing layer under the bearing surface.

If a density of the bearing layer under the relief surface is made larger than a density of the bearing layer under the bearing surface by compressing the bearing layer under the relief surface, the anti-fatigue-breakage characteristic at the relief surface is further improved.

BRIEF DESCRIPTION OF THE DRAWINGS

FIG. 7 is an enlarged cross-sectional view taken along a line VII—VII in FIG. 6.

DETAILED DESCRIPTION OF PREFERRED EMBODIMENTS

Figure 1:
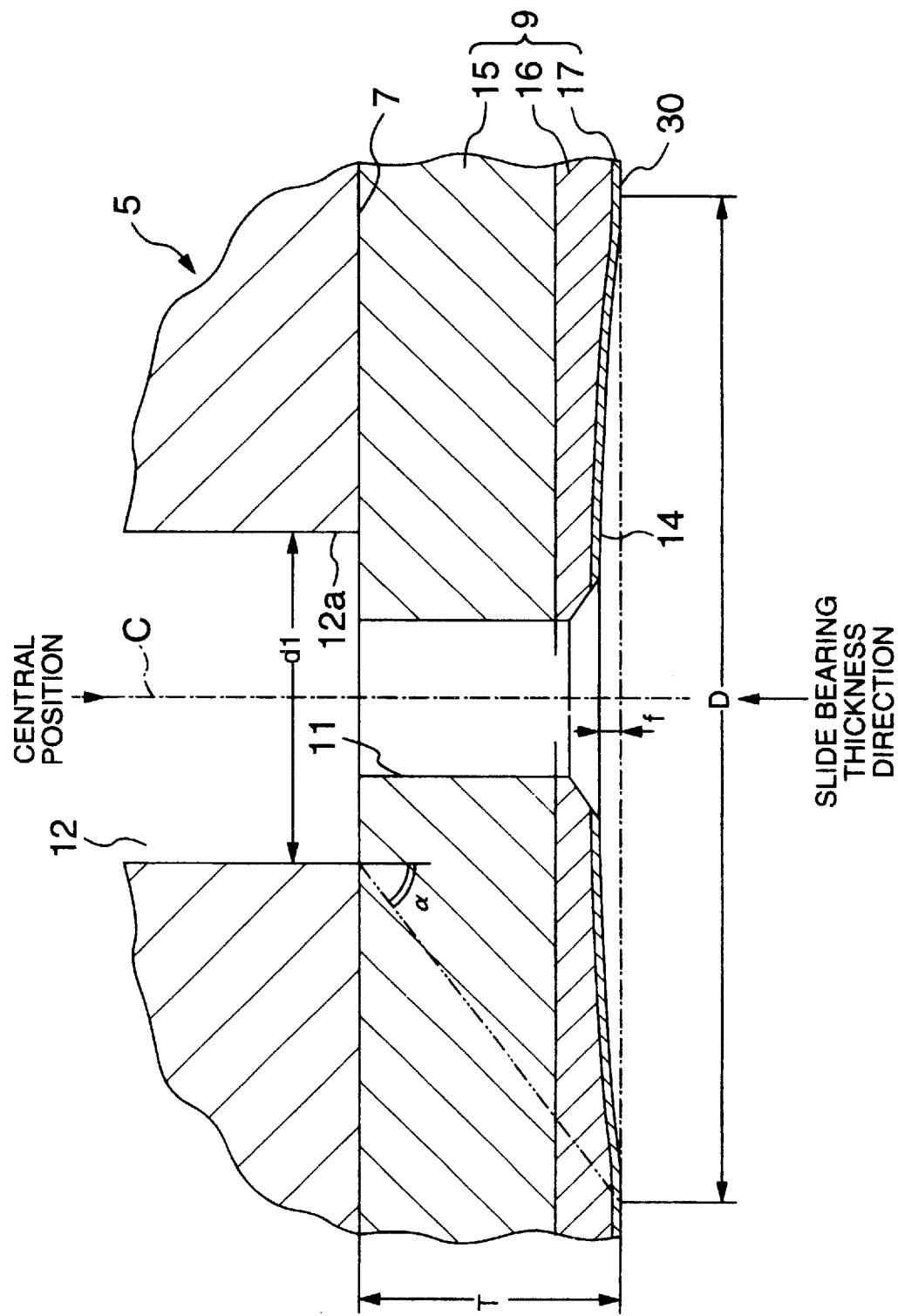
FIG. 1 is a cross-sectional view taken along a line I—I in FIG. 2 and showing a first embodiment of the invention.
Figure 2:
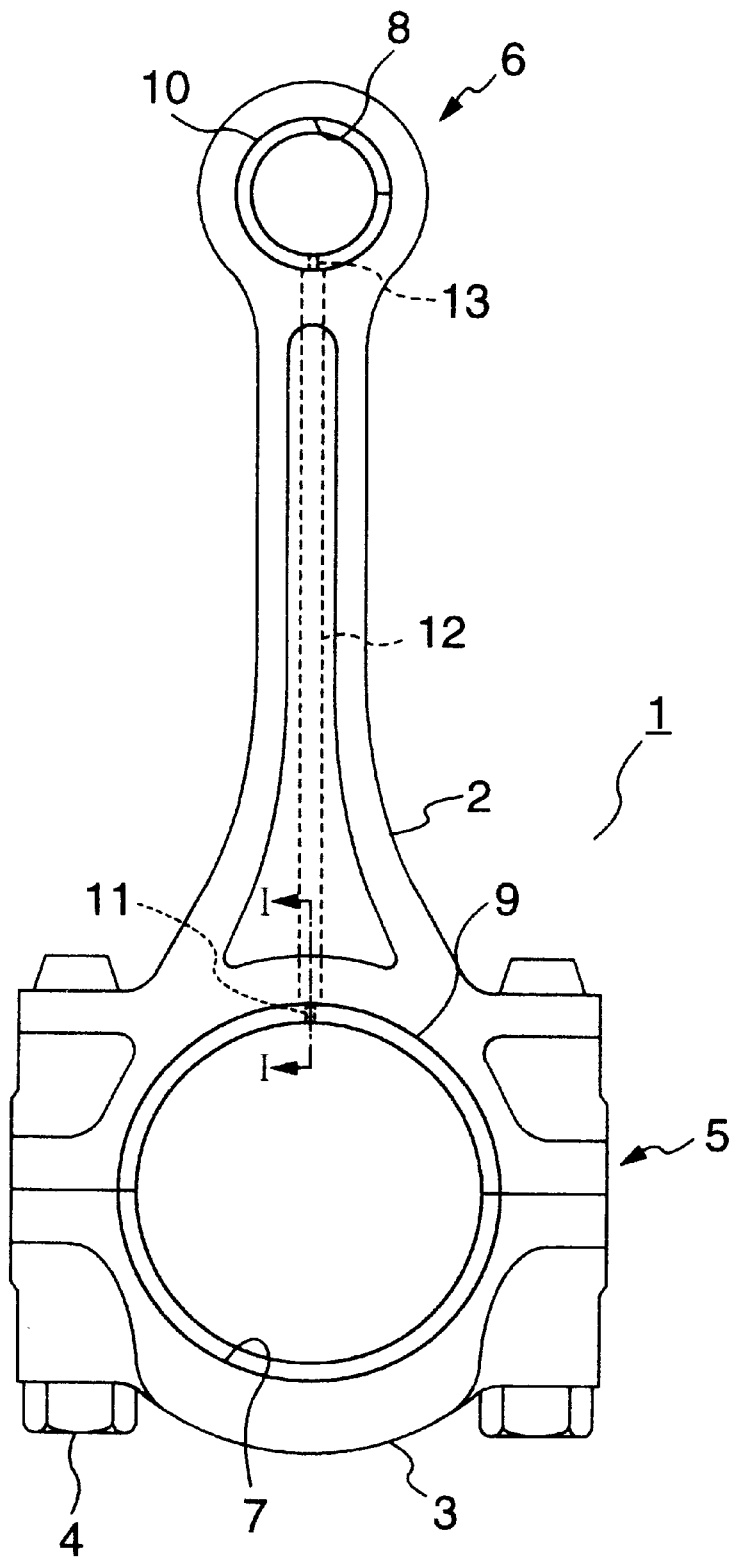
FIG. 2 is a front view showing a connecting rod in which slide bearings of the invention are fitted.

A connecting rod 1 as shown in FIG. 2 receives therein slide bearings 9 and 10 as shown in FIG. 1 as a first embodiment of the invention. The connecting rod 1 includes a rod body 2 and a cap 3 fixed to the rod body 2 by bolts 4. A large end portion 5 of the connecting rod 1 formed by the rod body 2 and the cap 3 receives the slide bearing 9 in a bearing housing hole 7 as the claimed bearing mounting surface, and a small end portion 6 of the connecting rod 1 receives the slide bearing 10 in a bearing housing hole 8 as the claimed bearing mounting surface. A crank pin of a crank shaft (received in the slide bearing 9) and a piston pin of a piston (received in the slide bearing 10) (both pins are not shown) are connected to each other through the connecting rod 1 in a combustion engine. The slide bearing 9 is a divided-type bearing which is formed by two main bearing elements, and the slide bearing 10 is a joint-less cylindrical type or a wrapped bush type.

A lubricant is supplied into an inner surface of the slide bearing 9, and subsequently flows into an inner surface of the slide bearing 10 through a lubricant hole 11 in the slide bearing 9, a lubricant path 12 in the rod body 2 and a lubricant hole 13 in the slide bearing 10. A diameter of the lubricant path 12 should be large, because it is formed by a drill cutting and a diameter of the drill proceeding through the rod body 2 should be large to prevent a breakage thereof. On the other hand, a diameter of the lubricant holes 11 and 13 should be small to keep an area bearing a load to be supported movably by the slide bearings as large as possible. Therefore, the diameter of the lubricant holes 11 and 13 are smaller than that of the lubricant path 12.

An axial length of the large end portion 5 and the small end portion 6 of the connecting rod 1 is larger than that of the slide bearings 9 and 10 so that outer (reverse) surfaces of the slide bearings 9 and 10 are wholly received by inner (bearing mounting) surfaces of the bearing housing holes 7 and 8. On the other hand, parts of the slide bearings 9 and 10 facing to the lubricant path 12 are not supported by the inner (bearing mounting) surfaces so that the parts of the slide bearings 9 and 10 adjacent to opening areas 12a of the lubricant path 12 and the lubricant holes 11 and 13 form overhangs from the inner (bearing mounting) surfaces.

Bearing surfaces 30 of the slide bearings 9 and 10 facing to the crank pin and the piston pin surround respective arc-shaped relief surfaces 14 (caving in from the bearing surfaces 30) adjacent to the overhangs, the opening areas 12a and the lubricant holes 11 and 13. Boundaries between the bearing surfaces 30 and the relief surfaces 14 are rounded.

The slide bearings 9 and 10 have respective hard steel backing plates 15 of relatively larger elastic-coefficient and/or yield-stress and soft non-iron-base (for example, Cu-base or Al-base) bearing alloy layers 16 of relatively smaller elastic-coefficient and/or yield-stress fixed on the steel backing plates 15. A non-iron-base (for example, Pb-base or Sn-base) overlay layer 17 may be additionally arranged on the bearing alloy layer 16 of the slide bearing 9 by plating process. Thicknesses of the steel backing plates 15, the bearing alloy layers 16 and the overlay layer 17 are, for example, about 1.2 mm, 0.3 mm and 20 $\mu$m, respectively. Dents are formed in the soft bearing alloy layers 16 before the plating of the overlay layer 17 on surfaces of the slide bearings 9 and 10 which will face to the pins so that the relief surfaces 14 caving in from the bearing surfaces 30 are formed over the dents. When thicknesses or inner diameters of the bearing alloy layers 16 are determined by broaching or boring, the reverse surfaces of the slide bearings 9 and 10 on the hard steel backing plates 15 to be contacted with the inner (bearing mounting) surfaces of the bearing housing holes 7 and 8 may be compressed partially to be elastically deformed at portions thereof corresponding to the relief surfaces 14 by plated projecting area on jig surfaces on which the slide bearings 9 and 10 are set for the broaching or boring, so that the dents are formed after removed from the jig surfaces. The dents may be formed by partial cutting or grinding of the bearing alloy layers 16. The dents may be formed by compressing partially the bearing alloy layers 16 to be plastically deformed so that the dents are formed. The plastically deformed portions of the bearing alloy layers 16 have high anti-fatigue-breakage characteristics.

The relief surfaces 14 extend from a central position C of the circular opening areas 12a of the lubricant path 12 on the bearing housing holes 7 and 8 to an outer circumferential diameter or width D determined, when d1 is an inner diameter or width of the opening area 12a, and T is a thickness of the slide bearing, by the following formula:

$$d1 \leq D \leq d1 + 6T$$

A maximum depth f of the relief surfaces 14 at peripheral edges of the lubricant holes 11 and 13 is 1–30 $\mu$m, preferably about 10 $\mu$m.

When the crank pin rotates to generate a lubricant pressure between the crank pin and the slide bearing 9 so that the crank pin is borne by the slide bearing 9 through the lubricant, a driving force is transmitted to the large end portion 5.

Since clearances between the relief surfaces 14 and the pins increase toward the maximum depth f of the relief surfaces 14, the lubricant pressures therebetween decreases toward the maximum depth f of the relief surfaces 14. Therefore, loads applied onto the relief surfaces 14 are small and deformations of the overhangs are kept small so that the anti-fatigue-breakage characteristics of the overhangs are improved.

When the slide bearing 9 or 10 has the overlay layer 17, the overlay layer 17 of original thickness of 20 $\mu$m is not completely worn after the slide bearing 9 or 10 is broken by fatigue breakage. Therefore, 20–30 $\mu$m (preferably, 25 $\mu$m) is sufficient as the maximum depth f of the relief surfaces 14. If the maximum depth f of the relief surfaces 14 is more than 30 $\mu$m, the lubricant pressures on the relief surfaces decrease excessively. When the slide bearing 9 or 10 does not have the overlay layer 17, the maximum depth f of the relief surfaces 14 should be not less than 1 $\mu$m (preferably 5 $\mu$m) for securely improving the anti-fatigue-breakage characteristic.

A deformation region of the slide bearing 9 or 10 extends between a peripheral edge of the opening area 12a and a certain area on the bearing surfaces 30 larger than the peripheral edge of the opening area 12a as seen in the slide bearing thickness direction. A width or diameter of the certain area may be estimated by (d1+2Ttan30°) when $\alpha$ is 30° or (d1+2Ttan60°) when α is 60°. If the relief surfaces 14 cover the deformation region, the anti-fatigue-breakage characteristic is improved, and if the relief surfaces are confined as the above degrees, area amounts of the bearing surfaces 30 are kept sufficiently large. Therefore, the outer circumferential-diameter or width D or L (L is a width of a groove facing to the reverse surface) is determined by the following formula $$d1 \text{ or } L \leq D \text{ or } W \leq (d1 \text{ or } L) + 6T \qquad (1).$$

When (d1 or L)+6T<D or W, that is, α or β is too large, an area of the relief surface 14 is too large and an area of the bearing surface 30 is too small so that a bearing capacity is significantly decreased. When D or W<d1 or L, that is, α or β is too small, the area of the relief surface 14 is too small so that the anti-fatigue-breakage characteristic is not improved.

Figure 3A:
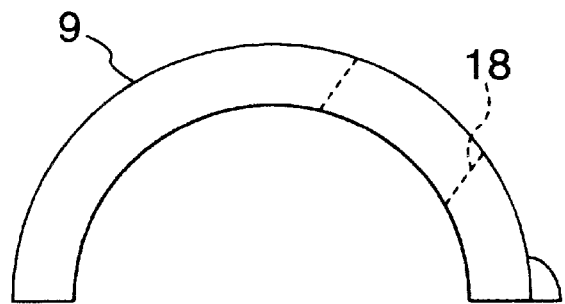
FIG. 3a is a front view showing a second embodiment of the invention.
Figure 3B:
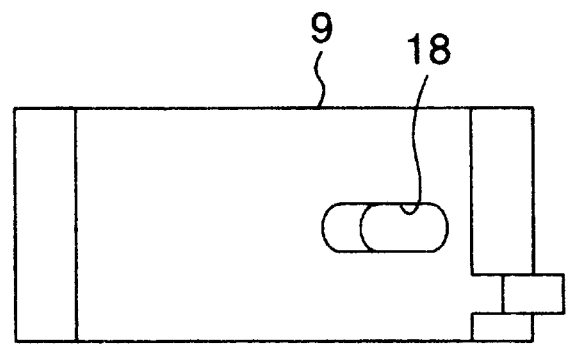
FIG. 3b is a bottom view showing the second embodiment of the invention.
Figure 4:
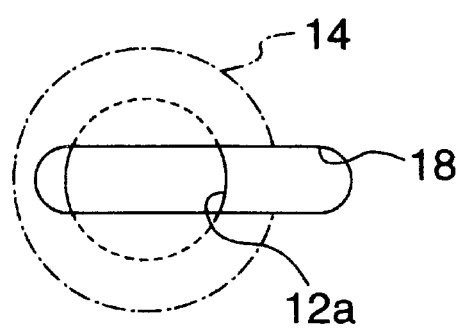
FIG. 4 is a schematic view showing a positional relationship between a relief surface and a lubricant path.
Figure 5:
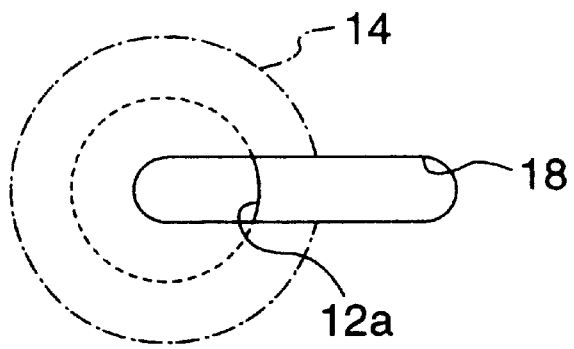
FIG. 5 is a schematic view showing another positional relationship between the relief surface and the lubricant path.

In a second embodiment shown in FIGS. 3–5, a lubricant hole 18 extending through the slide bearing 9 or 10 has an elongated cross-section which can face to a plurality of kinds of the lubricant paths 12 different from each other in circumferential position thereof. The relief surface 14 over the lubricant hole 18 is positioned in accordance with a position of one of the various lubricant paths 12 which is arranged at the largest bearing load position of the slide bearings 9 or 10. The relief surface 14 may have an elongated cross-sectional shape corresponding to the lubricant hole 18.

Figure 6:
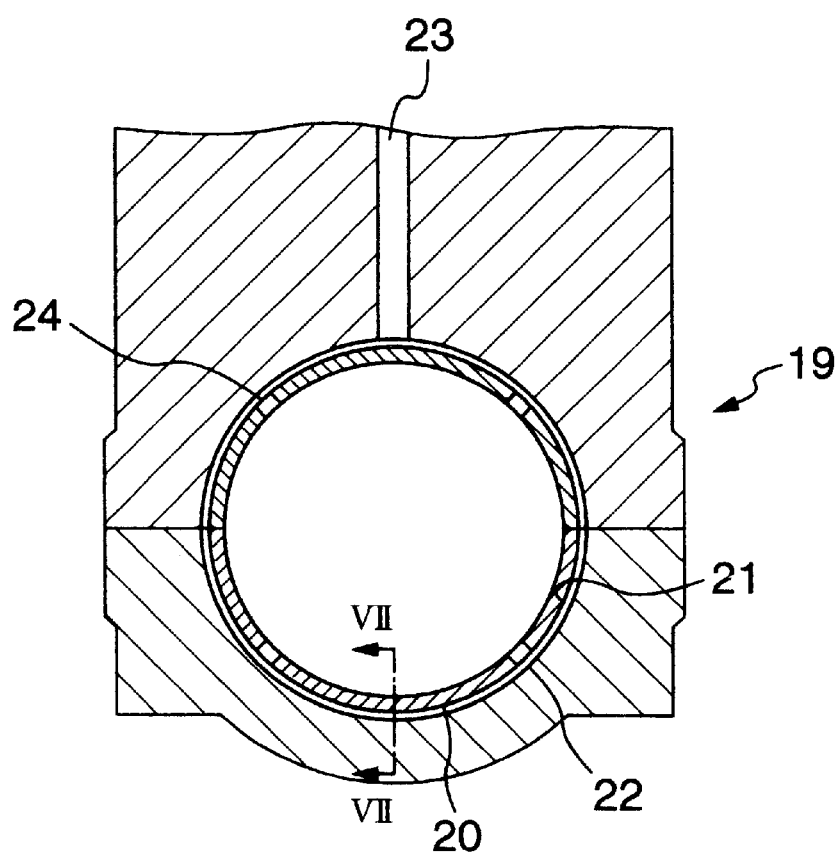
FIG. 6 is a cross-sectional view showing a bearing housing in which the slide bearings of the invention are fitted.

In a third embodiment mounted in an engine block as an engine crankshaft main bearing as shown in FIGS. 6 and 7, an inner surface of a bearing fitting hole 21 of a bearing housing 19 onto which a main slide bearing 20 is mounted has a lubricant groove 22 surrounding circumferentially the main slide bearing 20 at an axially central position of the main slide bearing 20. A lubricant path 23 in the bearing housing 19 opens in the lubricant groove 22. A lubricant supplied from a lubrication pump to the lubricant groove 22 flows into a bearing surface of the main slide bearing 20.

A relief surface 25 extends over the lubricant groove 22 as the claimed recess or hole facing the overhang of the main slide bearing 20 so that the anti-fatigue-breakage characteristic of the overhang is improved.

The width W of the relief surface 25 whose axial central position is identical to that of the lubricant groove 22 is determined on the above describe formula (1). The maximum depth of the relief surface 25 at the axial central position thereof is 1–30 μm.

The opening area 12a and the relief surface 25 may have respective oval shapes corresponding to each other. When the overlay layer 17 is not arranged on the bearing alloy layer, the maximum depth of the relief surface should be not less than 1 μm for improving the anti-fatigue-breakage characteristic, and may be less than 20 μm, because of high anti-wearing characteristic of the bearing alloy layer. An Al type bearing alloy may be arranged on the backing plate.

The slide bearing should have the relief surface when being mounted on the bearing mounting surface. Therefore, the relief surface may not cave in relative to the bearing surface before the slide bearing is mounted on the bearing mounting surface, if a reverse surface portion of the relief surface to be formed subsequently caves in relative to another reverse surface portion of the bearing surface before the slide bearing is mounted on the bearing mounting surface and the reverse surface portion of the relief surface is pressed against the bearing mounting surface by close fitting between the slide bearing and the bearing mounting surface.

What is claimed is:

1. A slide bearing adapted to be attached onto a bearing mounting surface including at least one of recess and hole facing to the slide bearing, comprising, a bearing surface adapted to face to a counter member to be borne movably by the slide bearing, a reverse surface adapted to contact with the bearing mounting surface, and a relief surface adapted to be arranged adjacent to the at least one of recess and hole in a slide bearing thickness direction, and adapted to face to the counter member with a relatively larger clearance depth between the relief surface and the counter member in comparison with a clearance depth between the bearing surface and the counter member in the slide bearing thickness direction.

2. A slide bearing according to claim 1, wherein the relief surface is arc-shaped as seen in a direction parallel to the bearing surface.

3. A slide bearing according to claim 1, wherein a thickness of the slide bearing at the bearing surface is larger than a thickness of the slide bearing at the relief surface.

4. A slide bearing according to claim 1, wherein the relief surface caves in relative to the bearing surface before the slide bearing is attached onto the bearing mounting surface.

5. A slide bearing according to claim 1, wherein a part of the reverse surface at a reverse area of the relief surface caves in relative to another part of the reverse surface at a reverse area of the bearing surface before the slide bearing is attached onto the bearing mounting surface.

6. A slide bearing according to claim 1, wherein a cross-sectional area of the at least one of recess and hole is smaller than that of the relief surface as seen in the slide bearing thickness direction.

7. A slide bearing according to claim 1, wherein the slide bearing comprises a through hole for fluidal communication between the at least one of recess and hole and a clearance between the relief surface and the counter member, and a cross-sectional area of the through hole is smaller than that of the at least one of recess and hole as seen in the slide bearing thickness direction.

8. A slide bearing according to claim 1, wherein a clearance depth between the relief surface and the counter member increases, toward a central position of the at least one of recess and hole, as seen in the slide bearing thickness direction.

9. A slide bearing according to claim 1, wherein a clearance between the relief surface and the counter member is surrounded by a clearance between the bearing surface and the counter member as seen in the slide bearing thickness direction.

10. A slide bearing according to claim 1, further comprising a fluidal lubricant, wherein a clearance between the relief surface and the counter member is limited to such a degree that the relief surface bears the counter member by a dynamic pressure of the fluidal lubricant generated on the relief surface by a relative movement between the relief surface and the counter member and the dynamic pressure of the fluidal lubricant generated on the relief surface is smaller than another dynamic pressure of the fluidal lubricant generated on the bearing surface by a relative movement between the bearing surface and the counter member.

11. A slide bearing according to claim 1, wherein the slide bearing including a backing plate of relatively large elastic coefficient and a bearing layer of relatively small elastic coefficient on the backing plate, the bearing layer faces to the counter member, a thickness of the backing plate under the relief surface is substantially equal to a thickness of the backing plate under the bearing surface, and a thickness of the bearing layer under the relief surface is smaller than a thickness of the bearing layer under the bearing surface so that the relief surface caves in relative to the bearing surface.

12. A slide bearing according to claim 1, wherein the slide bearing including a backing plate of relatively large elastic coefficient and a bearing layer of relatively small elastic coefficient on the backing plate, the bearing layer faces to the counter member, and the backing plate is fully covered by the bearing layer as seen in the slide bearing thickness direction.

13. A slide bearing according to claim 1, wherein the slide bearing including a backing plate of relatively large elastic coefficient and a bearing layer of relatively small elastic coefficient on the backing plate, the bearing layer faces to the counter member, and a thickness of the backing plate under the relief surface is substantially constant.

14. A slide bearing according to claim 1, wherein a width of the at least one of recess and hole is not more than that of the relief surface as seen in the slide bearing thickness direction.

15. A slide bearing according to claim 1, wherein a maximum distance between the relief surface and the bearing surface in the slide bearing thickness direction is not less than 1 µm.

16. A slide bearing according to claim 1, wherein a maximum distance between the relief surface and the bearing surface in the slide bearing thickness direction is not more than 30 µm.

17. A slide bearing according to claim 1, wherein the slide bearing including a backing plate of relatively large elastic coefficient and a bearing layer of relatively small elastic coefficient on the backing plate, the bearing layer faces to the counter member, and a maximum distance between the relief surface and the bearing surface in the slide bearing thickness direction is not more than a thickness of the bearing layer under the bearing surface.

18. A slide bearing according to claim 1, wherein a width of the relief surface is not less than a width of the at least one of recess and hole and is not more than (the width of the at least one of recess and hole+(a thickness of the slide bearing*6)).

19. A slide bearing according to claim 1, wherein a density of the bearing layer under the relief surface is larger than a density of the bearing layer under the bearing surface.

* * * * *